US011159596B2

(12) United States Patent
Bastide et al.

(10) Patent No.: US 11,159,596 B2
(45) Date of Patent: Oct. 26, 2021

(54) STREAMING MEDIA ABANDONMENT MITIGATION

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/938,422

(22) Filed: Mar. 28, 2018

(65) Prior Publication Data
US 2019/0306215 A1    Oct. 3, 2019

(51) Int. Cl.
| G06F 15/173 | (2006.01) |
| H04L 29/06 | (2006.01) |
| G06Q 30/02 | (2012.01) |
| H04L 29/08 | (2006.01) |
| G06F 15/16 | (2006.01) |

(52) U.S. Cl.
CPC ....... *H04L 65/602* (2013.01); *G06Q 30/0255* (2013.01); *H04L 65/4069* (2013.01); *H04L 67/22* (2013.01)

(58) Field of Classification Search
CPC ... H04L 65/602; H04L 67/22; H04L 65/4069; H04L 65/4084; G06Q 30/0255
USPC ................................................ 709/224, 231
See application file for complete search history.

(56) References Cited

U.S. PATENT DOCUMENTS

| 9,270,767 B2 | 2/2016 | Langlois et al. |
| 9,589,237 B1* | 3/2017 | Qamar .................. G06F 16/245 |
| 2009/0193485 A1* | 7/2009 | Rieger ............... H04N 21/2402 |
| | | 725/114 |

(Continued)

FOREIGN PATENT DOCUMENTS

| CN | 104008109 A | 8/2014 |
| CN | 106537901 A | 3/2017 |

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Karen C Tang
(74) *Attorney, Agent, or Firm* — Robert D. Bean

(57) ABSTRACT

According to one embodiment, a method, computer system, and computer program product for improving a user's dwell time on streaming media is provided. The present invention may include receiving user information; receiving access to a media stream; analyzing the media stream for stream information; evaluating user activity for abandonment; predicting, based on user information, stream information, and user activity, likely points of abandonment; identifying, based on user information and stream information, points of interest within the media stream; generating, based on the points of interest, the likely points of abandonment, or the user activity, one or more interactive elements, where the one or more interactive elements inform the viewer of the one or more points of interest.

20 Claims, 5 Drawing Sheets

(56) References Cited

U.S. PATENT DOCUMENTS

| | | | | |
|---|---|---|---|---|
| 2010/0211439 | A1* | 8/2010 | Marci | G06Q 10/10 |
| | | | | 705/7.29 |
| 2011/0256520 | A1* | 10/2011 | Siefert | G09B 5/10 |
| | | | | 434/322 |
| 2012/0278179 | A1* | 11/2012 | Campbell | G06Q 30/0255 |
| | | | | 705/14.69 |
| 2013/0111005 | A1* | 5/2013 | Chu | G06N 7/005 |
| | | | | 709/224 |
| 2013/0138743 | A1 | 5/2013 | Amento et al. | |
| 2014/0280890 | A1 | 9/2014 | Yi et al. | |
| 2015/0120712 | A1* | 4/2015 | Yi | G06F 16/4387 |
| | | | | 707/723 |
| 2015/0127662 | A1 | 5/2015 | Yi et al. | |
| 2015/0245103 | A1* | 8/2015 | Conte | H04N 21/47815 |
| | | | | 725/60 |
| 2016/0012485 | A1 | 1/2016 | Dong et al. | |
| 2016/0014461 | A1* | 1/2016 | Leech | H04N 21/4668 |
| | | | | 725/14 |
| 2016/0255384 | A1* | 9/2016 | Marci | H04N 21/4532 |
| | | | | 725/12 |
| 2016/0337441 | A1* | 11/2016 | Bloomquist | G06Q 10/06 |
| 2016/0381110 | A1* | 12/2016 | Barnett | H04L 65/601 |
| | | | | 709/231 |
| 2017/0140285 | A1* | 5/2017 | Dotan-Cohen | G06N 5/048 |
| 2017/0206557 | A1* | 7/2017 | Abrol | G06Q 30/0261 |
| 2017/0264919 | A1* | 9/2017 | Amine | H04N 21/2187 |
| 2017/0359626 | A1* | 12/2017 | Chen | G11B 27/005 |
| 2018/0181996 | A1* | 6/2018 | Matthews | G06Q 30/0269 |
| 2018/0213015 | A1* | 7/2018 | Jain | H04N 21/44029 |
| 2018/0302677 | A1* | 10/2018 | Patel | H04N 21/44222 |
| 2019/0005024 | A1* | 1/2019 | Somech | G06F 16/243 |
| 2019/0005455 | A1* | 1/2019 | Hilckox | G06Q 10/107 |
| 2019/0034976 | A1* | 1/2019 | Hamedi | G06Q 30/0271 |
| 2019/0174170 | A1* | 6/2019 | Chen | H04N 21/4316 |
| 2019/0205698 | A1* | 7/2019 | Liu | G06F 16/907 |
| 2019/0205839 | A1* | 7/2019 | Dotan-Cohen | A61B 5/1118 |
| 2019/0208251 | A1* | 7/2019 | Joao | H04N 21/25891 |
| 2019/0222892 | A1* | 7/2019 | Faulkner | G06K 9/00288 |
| 2019/0266645 | A1* | 8/2019 | LaJoie | H04N 21/25891 |
| 2019/0281049 | A1* | 9/2019 | Scheller | H04L 63/102 |

OTHER PUBLICATIONS

Liu et al., "Understanding Web Browsing Behaviors through Weibull Analysis of Dwell Time", SIGIR'10, Jul. 19-23, 2010, Geneva, Switzerland, pp. 1-8.

* cited by examiner

STREAMING MEDIA ABANDONMENT MITIGATION

BACKGROUND

The present invention relates, generally, to the field of computing, and more particularly to streaming media.

In recent times, there has been a significant shift in how media is consumed; traditional television and radio programming now competes with on-demand media, which allows a user to consume video and audio content at a time of their choosing rather than waiting for a scheduled broadcast time. However, on-demand media, broadcast television, and radio are all forms of 'streaming media,' which is any media that is delivered to a user from a provider in real time. Streaming media enables a user to rapidly select media of interest from a wealth of options, and media providers are often rewarded based on the viewership of their respective media; therefore, maximizing viewership is a major, if not paramount, goal of the field of streaming media.

SUMMARY

According to one embodiment, a method, computer system, and computer program product for improving a user's dwell time on streaming media is provided. The present invention may include receiving user information; receiving access to a media stream; analyzing the media stream for stream information; evaluating user activity for abandonment; predicting, based on user information, stream information, and user activity, likely points of abandonment; identifying, based on user information and stream information, points of interest within the media stream; generating, based on the points of interest, the likely points of abandonment, or the user activity, one or more interactive elements, where the one or more interactive elements inform the viewer of the one or more points of interest.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
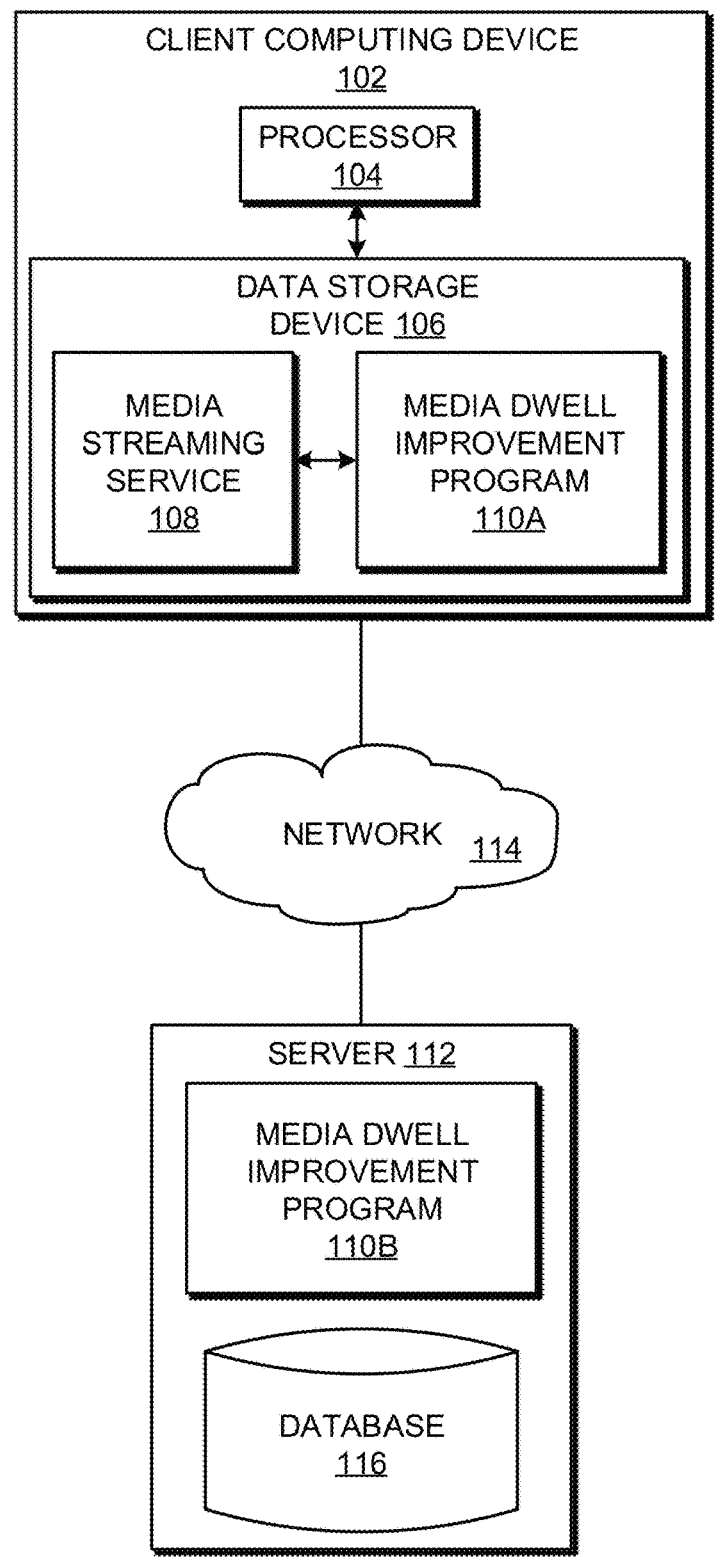
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to streaming media. The following described exemplary embodiments provide a system, method, and program product for, among other things, improving user dwell time on media. Therefore, the present embodiment has the capacity to improve the technical field of streaming media by proactively maintaining a user's interest in a media stream beyond the point where the user might otherwise have abandoned the stream, and thereby increasing viewership.

As previously described, there has recently been a significant shift in how media is consumed; traditional television and radio programming now competes with on-demand media, which allows a user to consume video and audio content at a time of their choosing rather than waiting for a scheduled broadcast time. However, on-demand media, broadcast television, and radio are all forms of 'streaming media,' which is any media that is delivered to a user from a provider in real time. Streaming media enables a user to rapidly select media of interest from a wealth of options, and media providers are often rewarded based on the viewership of their respective media; therefore, maximizing viewership is a major, if not paramount, goal of the field of streaming media.

The wealth of available options accessible via streaming media often results in users making frequent switches between media of interest or channels, gauging interest in the current media before making the decision to dwell on the media or switch to something different. A common problem faced by providers of streamed media is losing viewers who grow disinterested or distracted. For instance, a user may find the current channel she is consuming to be boring. The channel is discussing automatic log analysis, and she is not interested. She immediately changes the channel to one of more interest. In this situation, the initial channel loses the revenue potential and the all-important viewership. There is a clear need to optimize the user experience and enhance the likelihood of a user's dwell on a channel or media. As such, it may be advantageous to, among other things, implement a system that predicts a user's likelihood to continue to change channels or switch to other media, and proactively acts to maintain a user's interest and thereby increase the amount of time the user dwells on the media, improving viewership.

According to one embodiment, the invention is a method of using user information, demographic information, and stream information to predict the likelihood that a user will abandon a media stream. The method searches the video to identify points of interest to the user in subsequent positions or scenes in the media, and generates images, overlays, popups, or other means of visually conveying information to the user to inform the user of upcoming points of interest and otherwise maintain the user's interest in the stream.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for improving user dwell time on media.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a media streaming service 108 and a media dwell improvement program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a media dwell improvement program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Media streaming service 108 may be any service capable of receiving media from a provider and displaying it to the user in real time. Examples include on-demand streaming media services such as YouTube® (YouTube® and all YouTube®-based trademarks and logos are trademarks or registered trademarks of Google LLC and/or its affiliates), Amazon® (Amazon® and all Amazon®-based trademarks and logos are trademarks or registered trademarks of Amazon Technologies, Inc. and/or its affiliates), and Hulu® (Hulu® and all Hulu®-based trademarks and logos are trademarks or registered trademarks of Hulu, LLC and/or its affiliates), and broadcast television services such as Comcast® (Comcast® and all Comcast®-based trademarks and logos are trademarks or registered trademarks of Comcast Corporation and/or its affiliates) and Verizon® (Verizon® and all Verizon®-based trademarks and logos are trademarks or registered trademarks of Verizon Trademark Services LLC and/or its affiliates). The media streaming service 108 may be located on client computing device 102 or server 112 or on any other device located within network 114. Furthermore, media streaming service 108 may be distributed in its operation over multiple devices, such as client computing device 102 and server 112.

According to the present embodiment, the media dwell improvement program 110A, 110B may be a program capable of improving user dwell time on media. The media dwell improvement method is explained in further detail below with respect to FIG. 2. The media dwell improvement program 110A, 110B may be in communication with a camera or other sensors capable of observing the movements of a user. The media dwell improvement program 110A, 110B may be a discrete program or it may be a subroutine or method integrated into media streaming service 108. The media dwell improvement program 110A, 110B may be located on client computing device 102 or server 112 or on any other device located within network 114. Furthermore, media dwell improvement program 110A, 110B may be distributed in its operation over multiple devices, such as client computing device 102 and server 112.

Figure 2:
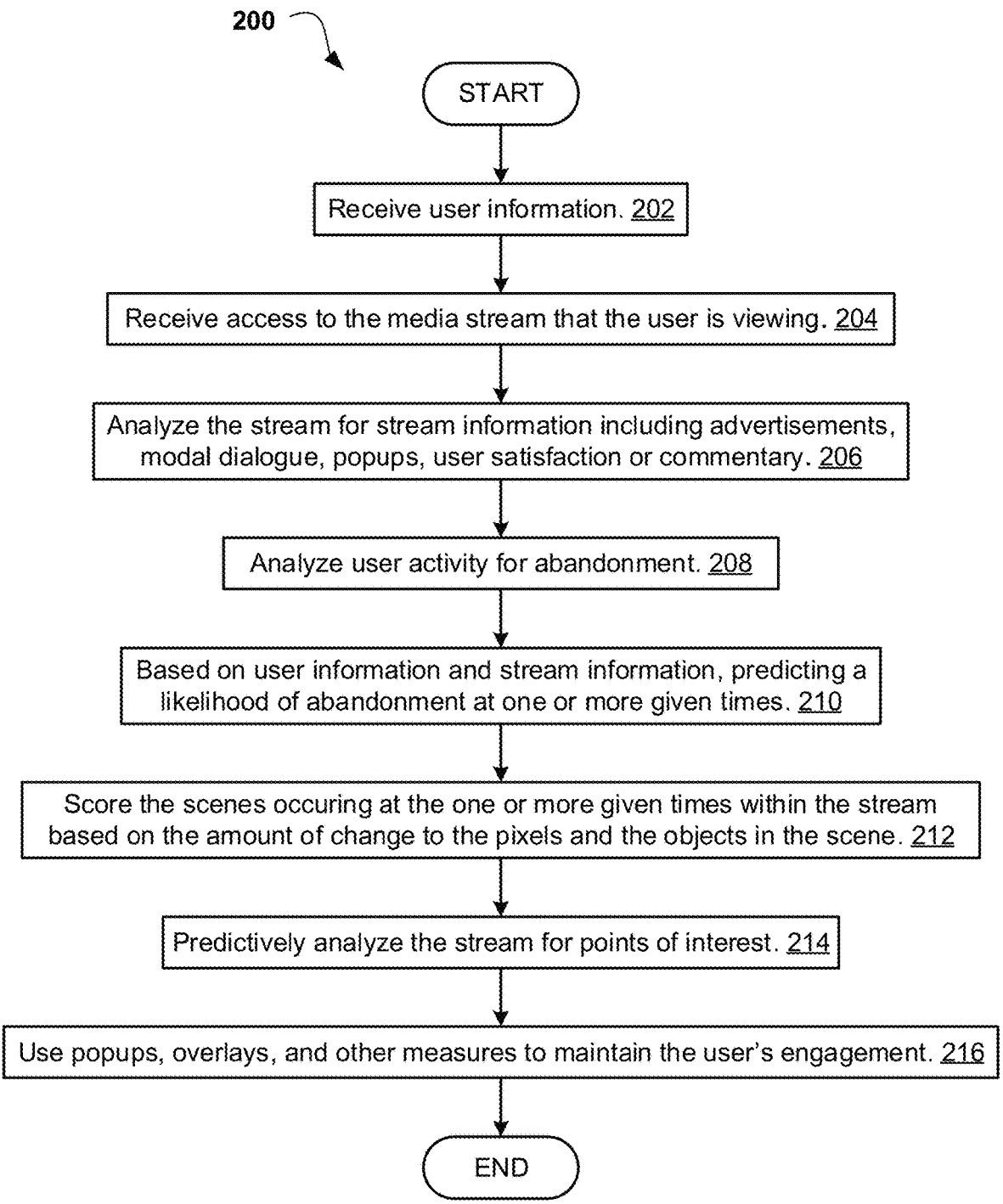
FIG. 2 is an operational flowchart illustrating a media dwell improvement process according to at least one embodiment.

Referring now to FIG. 2, an operational flowchart illustrating a media dwell improvement process 200 is depicted according to at least one embodiment. At 202, the media dwell improvement program 110A, 110B receives user information. User information may include information unique to an individual user, as well as information pertaining to the demographic of users to which a given user belongs. Specific user information may include the specific interests of the user that might influence what media the user consumes. For example, a user may be interested in skiing, and may be predisposed to watch videos of people skiing. User information may also include specific behavioral patterns of the user that might influence when a user stays engaged, or when a user abandons a video. For instance, perhaps the user abandons a video unless there is action, perhaps the user very rarely abandons videos on a certain topic or by a certain author, or maybe the user has a habit of switching media after two minutes of watching. Specific user information may further include personal information such as the age, weight, political leanings, socioeconomic status, geographic location, and other information relevant to both ascertaining interest in videos and also for identifying demographics to which the user belongs. Demographic information may include the general trends, behaviors, and interests pertaining to the demographic to which the user belongs; for instance, users that are 18 years old may be more likely to abandon videos in general than 40-year-olds, and therefore the predicted stream abandonment for an individual user could be adjusted based on age. User information, both specific and demographic, may be received from multiple sources; it may be entered by the querent manually, may be imported from other programs, or may be crawled from data repositories on the network 114 or from websites on the internet, for instance from social media websites.

Next, at 204, media dwell improvement program 110A, 110B receives access to the media stream that the user is viewing. At this step, media dwell improvement program 110A, 110B may communicate with media streaming service 108 to receive access to the stream that the user is currently consuming. This may include access to the entire video, or access to the video as it is streamed, and may also include information such as current viewership, or viewership at any given point during the stream, interests or demographics of the viewers, user satisfaction, comments, ratings, et cetera.

Then, at 206, media dwell improvement program 110A, 110B analyzes the stream for stream information including advertisements, modal dialogue, popups, user satisfaction, or commentary. Here, media dwell improvement program 110A, 110B searches both the stream and the stream information for any factors that might be relevant to the user's interest. For instance, advertisements might generally cause users to become disinterested and prompt users to abandon the stream. Searching the comment section, as well, may turn up comments identifying particularly salient points within the video that may affect user interest both negatively or positively. User satisfaction, viewership, ratings, and other information may likewise provide clues for how interested a given user may be in the video at different points.

Next, at 208, media dwell improvement program 110A, 110B analyzes user activity for abandonment. The media dwell improvement program 110A, 110B may first and foremost analyze user activity for abandonment by checking to see if media streaming service 108 has been terminated, or if the media has been paused, or if the user has switched to a different media channel or element. However, media dwell improvement program 110A, 110B may also identify constructive abandonment, where the user has lost interest and stopped paying attention to the media. The media dwell improvement program 110A, 110B may identify this constructive abandonment by analyzing the activity of the user on the desktop of their device, such as by locating the position of the pointer, identifying whether the media streaming service 108 has been minimized or moved to another screen, identifying whether other programs have been maximized or other tabs have been opened or moved to, identifying whether there is keyboard or mouse activity, et cetera. The media dwell improvement program 110A, 110B may also infer constructive abandonment by observing the actions of the user by means of a camera or other sensor; for example, media dwell improvement program 110A, 110B may use camera-based eye-tracking to ascertain that the user is no longer looking at the computer or at the window containing the media, or may see that a user is not present in front of the computer at all. In alternate embodiments, media dwell improvement program 110A, 110B may analyze user activity for abandonment continuously, or at regular intervals. If abandonment is detected, media dwell improvement program 110A, 110B may save the time at which the user abandoned the video, as well as the disparity between actual and predicted abandonment, and factors that may have contributed to abandonment, in order to better predict abandonment in the future.

Then, at 210, media dwell improvement program 110A, 110B predicts a likelihood of abandonment at one or more given times based on the user information and the stream information. The media dwell improvement program 110A, 110B may make this prediction based on a number of factors drawn from the stream information and user information, both specific and demographic, as well as user activity information such as keyboard activity, eye movement, or other behavior patterns from which user interest can be inferred. As an example, for a given user Adam and a given video Ski Fails, media dwell improvement program 110A, 110B may assess the following factors:

Stream Information: in the 2 minute 20 second video Ski Fails, everyone has stopped watching one minute and thirty seconds in;

Demographic User Information: Adam's demographic, 18-35 years of age, male, and is interested in sports, tends to leave one minute into a video;

Specific User Information: Adam tends to leave ski videos halfway through when the duration of the video is greater than 2 minutes;

User Activity Information: Adam is not moving restlessly in front of the computer and is not typing or moving the mouse, which suggests interest in the video;

Based on these factors, media dwell improvement program 110A, 110B may predict that Adam will leave the stream one minute and thirteen seconds into the video. In an alternate embodiment, media dwell improvement program 110A, 110B may assign a score to each of a number of factors relevant to a user's interest at a given point in the video, where the score represents the positive effect that factor will have on the user's interest; where the combined scores fail to exceed a predetermined threshold, media dwell improvement program 110A, 110B may predict the user to lose interest at that point in the video. In some embodiments, the media dwell improvement program 110A, 110B may predict a loss of interest at multiple points within a video. In some embodiments, media dwell improvement program 110A, 110B may conduct the step of predicting abandonment anew if the user continues watching the stream after the previously predicted time of abandonment has passed.

Next, at 212, media dwell improvement program 110A, 110B scores the scenes occurring at the one or more given times within the stream based on the amount of change to the pixels and objects in the scene. The media dwell improvement program 110A, 110B may utilize a service such as OpenCV to measure change to pixels and objects in the screen. The higher a score, the higher the change to pixels and objects in the screen in a given scene; from this, media dwell improvement program 110A, 110B may infer a greater amount of action, which may correlate with increased user interest.

Then, at 214, media dwell improvement program 110A, 110B predictively analyzes the stream for points of interest. Here, media dwell improvement program 110A, 110B analyzes the stream for points occurring subsequently in the stream to where the user currently is in order to identify elements which may be particularly of interest to a user, and knowledge of which may entice the user to continue watching. These points of interest may be scenes with a large amount of action in them, which may be indicated by the score assigned to a given scene in step 212 which exceeds a certain predetermined threshold, where the threshold may represent a minimum amount of visual activity to keep a user interested, and the threshold may be adjusted up or down based upon a user's individual and/or demographic preference for visual activity. Points of interest may also be identified or inferred based on the past patterns, template or formula of the stream that the user is watching; in many shows there is a climax close to the end of the show, which is likely to be a point of interest. For example, In the show Jeopardy!® (Jeopardy!® and all Jeopardy!®-based trademarks and logos are trademarks or registered trademarks of Jeopardy Productions, Inc. and/or its affiliates), Final Jeopardy usually occurs at 55 minutes in, so media dwell improvement program 110A, 110B may identify a point of interest at 55 minutes in to any given episode of Jeopardy!®. Points of interest may also be located by searching the comments for mentions of salient points within the video, or by spikes in user ratings or satisfaction at particular moments.

Next, at 216, media dwell improvement program 110A, 110B uses popups, overlays, and other measures to maintain the user's engagement. The media dwell improvement program 110A, 110 may use any of a number of means to inform users of upcoming points of interest in an attempt to maintain the user's interest and increase dwell time where media dwell improvement program 110A, 110 infers a user's interest to be waning, either where user activity suggests impending abandonment, soft abandonment has occurred, or where the video is approaching the predicted abandonment point. The media dwell improvement program 110A, 110 may select a point of interest based on any combination of factors including the point of interest's likely appeal to the user and the point of interest's proximity to the user's current position in the stream; media dwell improvement program 110A, 110 may deprioritize or disqualify points of interest that contain spoilers, or may mask over spoilers with logos. The media dwell improvement program 110A, 110 may use popups, modal dialogue, overlays, notations, or other means of visual interaction with a user to inform the user of upcoming selected points of interest. These methods of visual interaction may involve a still frame from the video at the point of interest, a picture in picture display of a short clip of the video at the point of interest, text describing the point of interest, et cetera. Examples may include a popup window saying "don't miss the sweet jump in 60 seconds!" or a picture in picture video of a ski jump from later in the stream. Where the point of interest is particularly significant such that identifying it with sufficient detail may be a spoiler, the method of user interaction may intentionally omit any details that might spoil the video, and may obfuscate the precise location of the point of interest, for example by offsetting the displayed picture-in-picture video or the stated text location of the point of interest/spoiler by several seconds. In embodiments where the stream is a live stream, media dwell improvement program 110A, 110 may request or institute a buffer of time between when the video is received from the provider and when it is displayed to the user, in order to give media dwell improvement program 110A, 110 time to send a popup, advertise an upcoming scene, or process upcoming stream content for points of interest. In situations where media dwell improvement program 110A, 110 has identified a number of points of interest in a stream below a predetermined threshold, and where the predicted time of abandonment is approaching, media dwell improvement program 110A, 110 may present an advertisement to the viewer.

It may be appreciated that FIG. 2 provides only an illustration of one implementation and does not imply any limitations with regard to how different embodiments may be implemented. Many modifications to the depicted environments may be made based on design and implementation requirements. For instance, while the exemplary embodiments are couched in terms of visual media, one of ordinary skill in the art would understand the invention to apply to auditory media. In embodiments where the media is auditory, points of interest may be based on reviews and comments and audio intensity, and media dwell improvement program 110A, 110 may interact with users via auditory prompts or by visual popups on a user's device.

Figure 3:
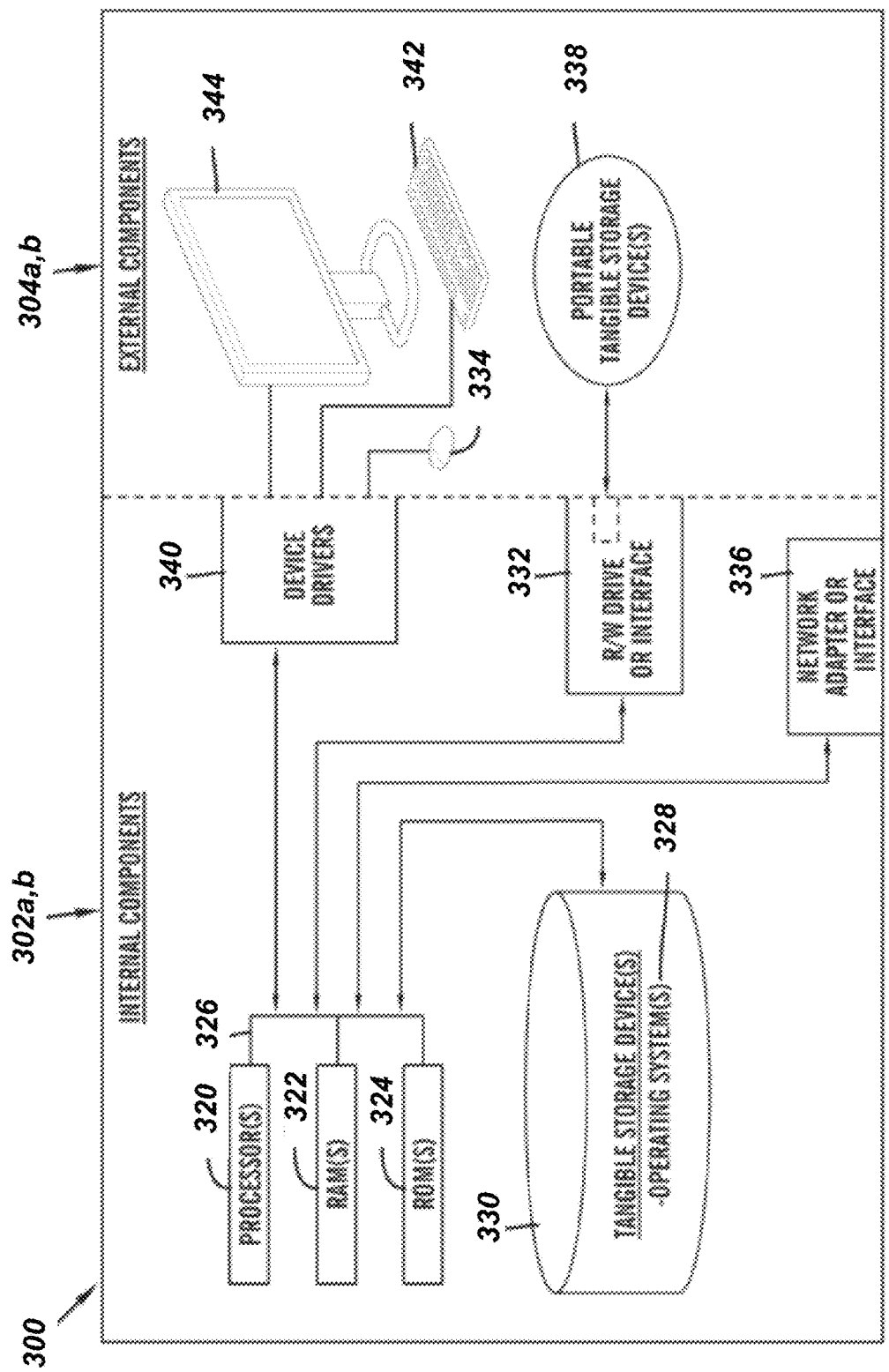
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the media streaming service 108 and the media dwell improvement program 110A in the client computing device 102, and the media dwell improvement program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the media dwell improvement program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The media streaming service 108 and the media dwell improvement program 110A in the client computing device 102 and the media dwell improvement program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the media streaming service 108 and the media dwell improvement program 110A in the client computing device 102 and the media dwell improvement program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers

340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
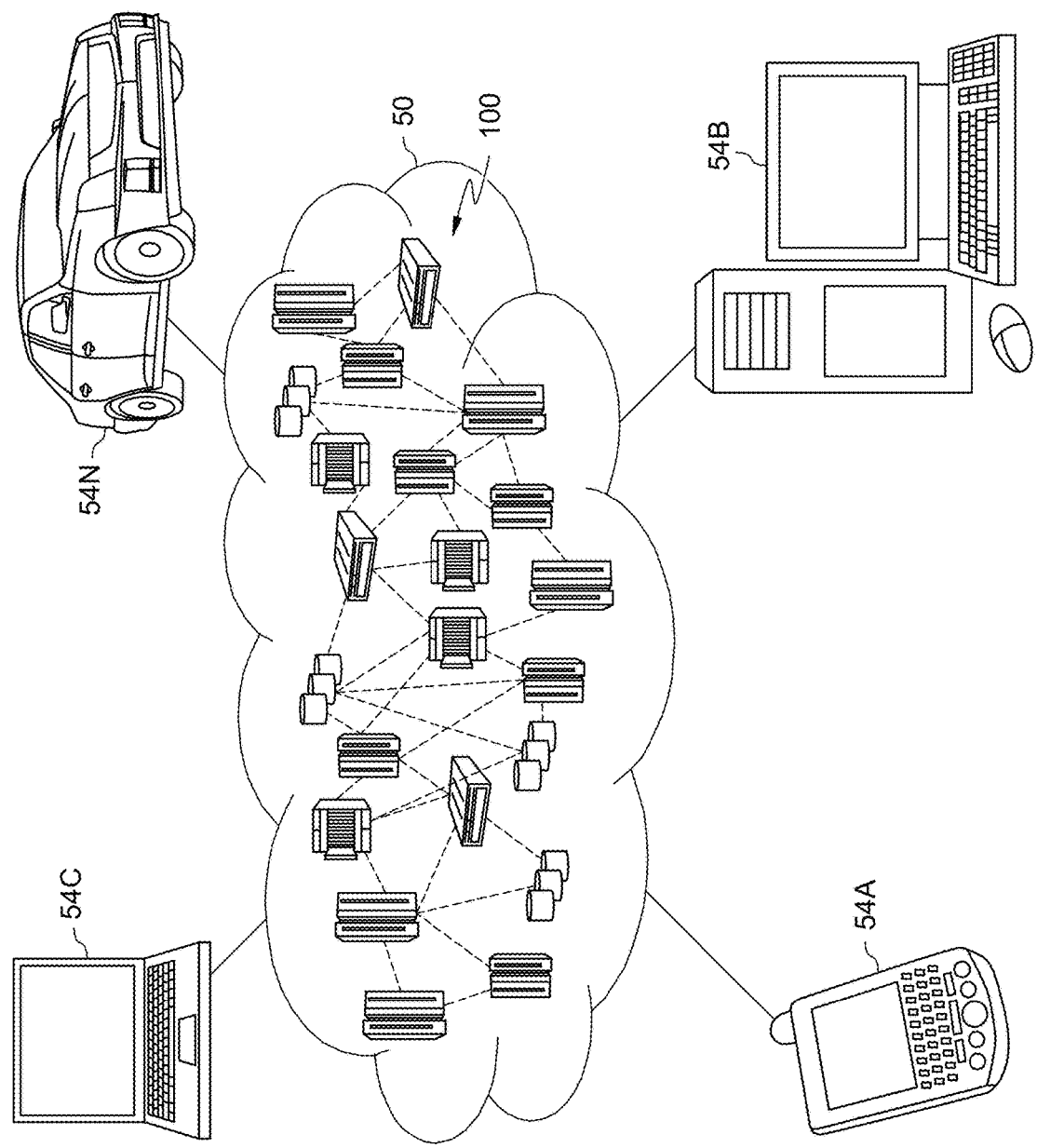
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
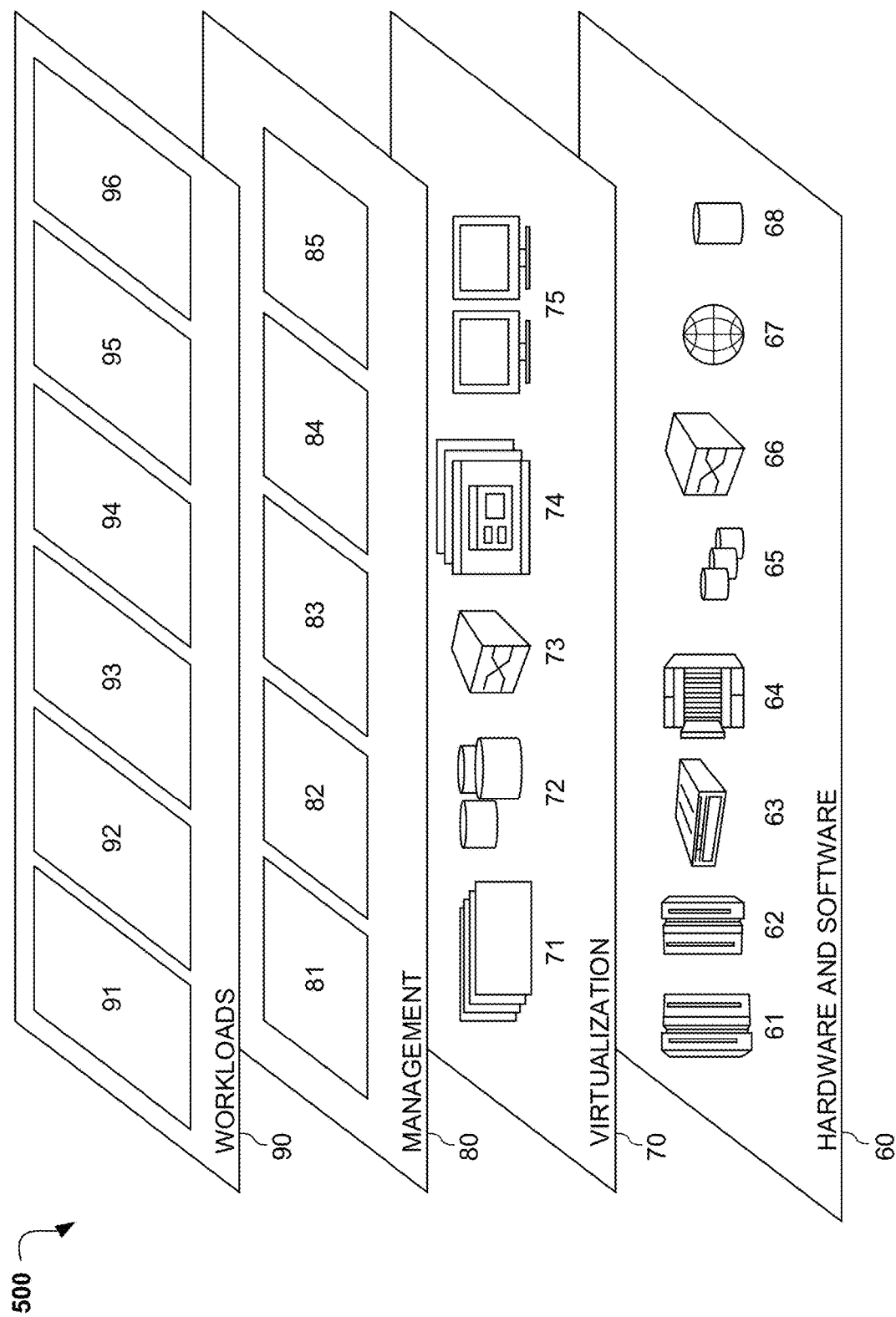
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media dwell improvement 96. media dwell improvement 96 may relate to improving user dwell time on media.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for improving a user's dwell time on streaming media, the method comprising:
predicting, based on user information, stream information, and user activity, a time of abandonment within a stream at which user interest falls below a threshold;
responsive to the predicted time of abandonment within the stream having passed, predicting a new time of abandonment within the stream;
responsive to determining that the stream is approaching the predicted time of abandonment, presenting one or more interactive elements to the user, wherein the one or more interactive elements inform the user of one or more points of interest identified within the stream; and
responsive to determining that the stream is approaching the predicted new time of abandonment, presenting the one or more interactive elements to the user.

2. The method of claim 1, further comprising:
scoring one or more scenes occurring subsequent to the user's current point in the stream based on an amount of change to a plurality of pixels within the scene.

3. The method of claim 2, wherein the one or more points of interest comprise one or more scenes wherein the score of each scene exceeds a predetermined threshold.

4. The method of claim 1, wherein the user information comprises both specific user information and demographic user information.

5. The method of claim 1, further comprising:
presenting an advertisement to the user when an amount of the one or more points of interest falls below a predetermined threshold.

6. The method of claim 1, wherein each interaction element relating to a point of interest that contains spoiler content is modified to omit the spoiler content.

7. The method of claim 1, wherein the one or more interactive elements are selected from a group consisting of popups, modal dialogue, picture-in-picture video, audio cues, text boxes, snapshots, and overlays.

8. A computer system for improving a user's dwell time on streaming media, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
predicting, based on user information, stream information, and user activity, a time of abandonment within a stream at which user interest falls below a threshold;
responsive to the predicted time of abandonment within the stream having passed, predicting a new time of abandonment within the stream;
responsive to determining that the stream is approaching the predicted time of abandonment, presenting one or more interactive elements to the user, wherein the one or more interactive elements inform the user of one or more points of interest identified within the stream; and
responsive to determining that the stream is approaching the predicted new time of abandonment, presenting the one or more interactive elements to the user.

9. The computer system of claim 8, further comprising:
scoring one or more scenes occurring subsequent to the user's current point in the stream based on an amount of change to a plurality of pixels within the scene.

10. The computer system of claim 9, wherein the one or more points of interest comprise one or more scenes wherein the score of each scene exceeds a predetermined threshold.

11. The computer system of claim 8, wherein the user information comprises both specific user information and demographic user information.

12. The computer system of claim 8, further comprising:
presenting an advertisement to the user, when a number of points of interest of the one or more points of interest falls below a predetermined threshold.

13. The computer system of claim 8, wherein each interaction element relating to a point of interest that contains spoiler content is modified to omit the spoiler content.

14. The computer system of claim 8, wherein the one or more interactive elements are selected from a group consisting of; popups, modal dialogue, picture-in-picture video, audio cues, text boxes, snapshots, and overlays.

15. A computer program product for improving a user's dwell time on streaming media, the computer program product comprising:
   one or more computer-readable tangible storage medium and program instructions stored on at least one of the one or more tangible storage medium, the program instructions executable by a processor to cause the processor to perform a method comprising:
      predicting, based on user information, stream information, and user activity, a time of abandonment within a stream at which user interest falls below a threshold;
      responsive to the predicted time of abandonment within the stream having passed, predicting a new time of abandonment within the stream;
      responsive to determining that the stream is approaching the predicted time of abandonment, presenting one or more interactive elements to the user, wherein the one or more interactive elements inform the user of one or more points of interest identified within the stream; and
      responsive to determining that the stream is approaching the predicted new time of abandonment, presenting the one or more interactive elements to the user.

16. The computer program product of claim 15, further comprising:
   scoring one or more scenes occurring subsequent to the user's current point in the stream based on an amount of change to a plurality of pixels within the scene.

17. The computer program product of claim 16, wherein the one or more points of interest comprise one or more scenes wherein the score of each scene exceeds a predetermined threshold.

18. The computer program product of claim 15, wherein the user information comprises both specific user information and demographic user information.

19. The computer program product of claim 15, further comprising:
   presenting an advertisement to the user, when a number of points of interest of the one or more points of interest falls below a predetermined threshold.

20. The computer program product of claim 15, wherein each interaction element relating to a point of interest that contains spoiler content is modified to omit the spoiler content.

* * * * *